United States Patent [19]
Allen

[11] Patent Number: 5,599,857
[45] Date of Patent: Feb. 4, 1997

[54] POLYMER CONCRETE COMPOSITION CONTAINING HIGH CEMENT CONTENT

[75] Inventor: William C. Allen, Pasadena, Calif.

[73] Assignee: Union Oil Company of California, El Segundo, Calif.

[21] Appl. No.: 176,549

[22] Filed: Jan. 3, 1994

[51] Int. Cl.$^6$ ...................................................... C08K 3/00
[52] U.S. Cl. .......................... 524/3; 524/2; 524/4; 524/5; 524/8; 524/650; 524/700; 524/789; 524/790
[58] Field of Search .................................. 524/2, 4, 650, 524/3, 5, 8, 700, 789, 790

[56] References Cited

U.S. PATENT DOCUMENTS

| | | | |
|---|---|---|---|
| 3,819,565 | 6/1974 | Yasima et al. | 524/8 X |
| 3,861,944 | 1/1975 | Steinberg et al. | 117/72 |
| 4,039,345 | 8/1977 | Emig et al. | 524/8 |
| 4,057,528 | 11/1977 | Hunt | 524/8 |
| 4,151,150 | 4/1979 | Peters et al. | 524/8 |
| 4,231,917 | 11/1980 | Zeldin et al. | 260/375 B |
| 4,500,674 | 2/1985 | Fontana et al. | 524/650 |
| 4,737,538 | 4/1988 | Halder et al. | 524/505 |
| 4,787,936 | 11/1988 | Suzuki et al. | 106/90 |
| 5,122,554 | 6/1992 | Allen | 524/8 |

OTHER PUBLICATIONS

"Plastic Procelian No. 30", Product Information, Sauereisen Cements Company, 1982.
"Calcium–Aluminate Cements", Bulletin 1–01, Lehigh Cement Company.
"Recommended Practice for Application of Cement Lining to Steel Tubular Goods, Handling, Installation and Joining", API PP 10E, American Petroleum Institute, Jul., 1987.
"Cement–Mortar Protective Lining and Coating for Steel Water Pipe–4 in and Larger–Shop Applied", AWWA C205–85, American Water Works Assoc., 1985.
"Polymer Cement Geothermal Well–Completion Materials", UC 66c, Brookhaven National Laboratory, (BNL), Depart. of Energy, Jul., 1980.

*Primary Examiner*—Judy M. Reddick
*Attorney, Agent, or Firm*—Gregory F. Wirzbicki; Alan H. Thompson

[57] ABSTRACT

A polymer concrete pipe liner is formed from a fluidized, but substantially waterless cement containing mixture applied to the pipe interior. The mixture contains inorganic cement particles, a liquid styrene mixture and one or more polyolefinically unsaturated co-monomers in a greater amount than the styrene. The mixture substantially excludes acrylonitrile and acrylamide. The co-monomers are preferably selected from a group including trimethylolpropane-trimethacrylate, trimethylolpropane-methacrylate, divinyl benzene, and hexadiene. Mixing liquid and solid aggregate components forms a slurry which is transferred to a pipe interior and centrifugally cast to form the liner. The composition avoids the need for high temperature curing the toxic reactive unsaturates to co-polymerize and cross-link polystyrene. A preferred embodiment incorporates the use of relatively high concentrations of cement material, usually above about 40 weight percent of the aggregate component of the mixed slurry, to further improve chemical resistance and strength characteristics.

49 Claims, 2 Drawing Sheets

POLYMER CONCRETE COMPOSITION CONTAINING HIGH CEMENT CONTENT

FIELD OF THE INVENTION

This invention relates to cementitious compositions. More specifically, the invention is concerned with compositions of waterless polymer concretes which can be used as linings for the interiors of piping systems handling harsh, high temperature fluids.

BACKGROUND OF THE INVENTION

Many piping system applications in chemical and natural resource recovery industries involve the handling of corrosive, erosive, scaling or otherwise harsh aqueous fluids. One economic approach to handling these difficult fluids is to spin cast a fluid-resistant liner onto the interior of a low cost, non-fluid-resistant pipe. The pipe material, such as low carbon steel, provides structural support for the costlier and/or structurally inadequate liner. One type of fluid-resistant liner is composed of an inorganic cementitious material, such as concretes containing Portland cement.

Common concrete lining materials are composed of a variety of inorganic non-metallic fillers and cements, forming a hydraulic slurry when mixed with water. The hydraulic slurry, which can temporarily flow like a liquid or plastic, is applied to the interior surfaces of the pipe and allowed to cure (slowly hydrate or precipitate) into a rigid pipe liner. Some water based hydratable cements (e.g., Portland cement) and concrete liners made therefrom are subject to chemical attack (e.g., corrosion, including dissolution) and mechanical attack (e.g., erosive) attack by certain harsh aqueous fluids, such as geothermal brines.

The primary objectives when creating new material components which can be used to fabricate a protective pipe liner are that the components: 1) produce a slurry (e.g., mortar) which can be applied to the pipe interior; 2) harden into a liner which is attached to and moves with the pipe; and 3) resist long term fluid chemical and mechanical attack. The lined pipe should also be rugged, safe, reliable, environmentally acceptable, and low in cost.

Current cements and/or concretes used to line pipe may perform some of these objectives well in certain applications, but may not be suitable for other applications. For example, a current American Petroleum Institute practice (API Recommended Practice 10E) recommends a high sulfate resistant hydraulic (water-based) cement for corrosive water applications. However, problems with this type of lining material have been observed when handling corrosive geothermal brines.

Many concrete additives are known to improve the strength and chemical stability of a water-based cement/concrete lining material. Additives providing such properties include polymers such as polystyrene. However, the water base cement is still the primary bonding agent of these additive mixtures.

A modification of the hydraulic cement/concrete lining process is to pre-coat the carbon steel before lining. An example of this technique is found in U.S. Pat. No. 4,787,936. High strength and adhesive attachment of the pre-coat is not required, since the pre-coat is encapsulated (e.g., protected from erosion) by the overlaying cementitious materials. However, the lining must still structurally withstand the environment, and a separate pre-coating process step is required.

A further modification is to post-coat and/or impregnate the pre-formed cementitious liner. An example of this approach is found in U.S. Pat. No. 3,861,944. The post-coating need not bond to the steel pipe. However, the post coating and/or liner impregnation requires a separate processing step.

The wide range of in-situ properties of geothermal fluids has made such fluids difficult to handle using these prior methods. The wide range of fluid properties is further widened during fluid processing, making them sometimes more difficult to handle. Temperatures from ambient to in excess of 300° C., pH's ranging from highly acidic to basic, and dissolved (and precipitated) solid contents ranging to in excess of 20% by weight of the aqueous mixture are known to cause fluid handling problems. Even if the recovery of geothermal fluids is not an objective, these difficult-to-handle fluids may have to be handled during the recovery of oil, gas, and minerals or other natural resource recovery operations.

More recently, a waterless cement (i.e., containing insufficient water to fully hydrate the cement), filler and polymerizable liquid mixture (termed polymer concrete) has been developed for geothermal and other difficult applications. The polymer concrete typically contains a solid or aggregate mixture component, such as silica sand filler and Portland cement, and a polymerizable liquid mixture component. The liquid mixture typically contains one or more monomers and polymerization additives (e.g., initiators, accelerators, catalysts, and the like). The liquid mixture may include cross-linking agents, coupling agents, initiators, solvents, surfactants, accelerators, and viscosity control compounds.

Because of its cost and desirable properties, some polymer concrete compositions have included styrene as a component. Polystyrene is relatively water resistant, tends to maintain its shape, and is chemically resistant to many harsh aqueous fluids, such as inorganic liquid acids or bases. However, polystyrene may lack at elevated temperature sufficient chemical resistance, strength, and/or toughness, unless co-polymerized and/or cross-linked with other reactive unsaturates. The styrene molecule has only one reactive hydrocarbon (vinyl) site, thus making the polystyrene chain once formed (i.e., the one site reacted) difficult to cross-link and/or bond strongly to aggregate particles.

In past polymer concrete compositions (as shown in U.S. Pat. No. 4,500,674), styrene is combined with at least two different co-monomers to achieve the desired chemical resistance and strength characteristics, one of which is either acrylamide or acrylonitrile. However, these reactive materials may be toxic and/or carcinogenic. They may also compromise low cost fabrication methods (e.g., high temperature mixing and/or curing may be required), broad chemical resistance, and temperature stability of the resulting liner.

In a modified approach (as shown in my co-pending U.S. patent application Ser. No. 07/773,256, now U.S. Pat. No. 5,276,074 the disclosure of which is incorporated by reference herein in its entirety), styrene is the major polymerizable constituent and poly-olefinically unsaturated co-polymers constitute a minor proportion of the liquid component, although acrylamide or acrylonitrile are avoided.

In another modified approach (as shown in U.S. Pat. No. 4,231,917), when an organosiloxane monomer forms the major polymerizable constituent instead of styrene, then styrene or other co-monomers including methylmethacrylates, trimethylolpropane-trimethacrylate, triallylcyanurate, n-phenylmalimide, and divinyl benzene, comprise minor constituents.

A persistent problem with these current polymer concrete compositions is the necessity of trading-off broad spectrum chemical resistance to obtain strength. None employs relatively large proportions of cement, and none eliminates sand filler (i.e., filler particles having an average cross-sectional dimensional size above 100 microns) from their aggregates. In addition, none having major proportions of unsaturated co-monomers and minor proportions of styrene in their starting liquid mixture avoids requiring two reactive unsaturates/co-monomers, one specified as either acrylamide or acrylonitrile. Such co-monomer material adds cost, complexity and health/safety risks to the manufacturing process of a finished product.

Other problems with current polymer concrete compositions are a propensity to crack, the carcinogenic nature of acrylonitrile and acrylamide, and difficulties in solubilizing in styrene and polymerizing acrylamide. Geothermal applications can impose severe conditions such as thermal expansion, vibration, two phase flow conditions, and the like. These conditions tend to crack brittle polymer concrete liners. Acrylamide is a solid at ambient temperatures, which requires high temperature to mix and co-polymerize with styrene, which is a liquid at ambient conditions. Controlling high temperature during spin casting may be particularly difficult to achieve.

SUMMARY OF THE INVENTION

The present invention provides a barrier or lining which is the reaction product of cement, styrene, one or more unsaturated monomers, and, as an option, a polymer dissolved in the styrene and/or co-monomers. The styrene/co-monomer/dissolved polymer portion (i.e., a liquid component) contains more co-monomer than styrene, and generally at least 50 percent by weight of poly-olefinically unsaturated co-monomer, and less than 50 percent by weight of styrene. The solid (i.e., aggregate) component preferably contains at least about 40 percent by weight of cement and utilizes minor amounts of sand filler, and in some cases, essentially no sand filler. The liners exhibit exceptionally high compressive strength after extended exposure (i.e., more than 6 months) to geothermal brine. The composition is essentially free of water sufficient to hydrate the cement, as well as previously required acrylamide and acrylonitrile co-monomers. The majority co-monomers of the liquid component are selected from poly-olefinically unsaturated compounds other than acrylonitrile or acrylamide. The composition avoids the need for high temperature curing and other costs associated with the excluded compounds.

In a preferred embodiment, a polymer concrete composition, having unusually high compressive strength after extended geothermal exposure, is prepared by mixing an aggregate component with a liquid component containing a major proportion having one or more poly-olefinically unsaturated co-monomer(s), such as trimethylolpropane-trimethacrylate, and a minor proportion of styrene monomer and/or polystyrene. The aggregate component contains a major proportion of Portland cement and a minor proportion of small particulate (less than 100 micron average dimension) filler material. It is highly preferred that the aggregate contain essentially no sand and that the liquid component contain essentially no acrylonitrile or acrylamide.

The materials described in the present invention produce superior liner strength under harsh geothermal operating conditions, achieving this result without a significant loss of broad spectrum chemical resistance. The liners made from these materials have been tolerant of off-design conditions, reliable, safe, and cost effective. The materials are also expected to meet the needs of other difficult applications. Various embodiments also include the use of aggregate gradation control, pozzolanic aggregate materials, high alumina cements, and rheology control additives to still further improve processing, handling, chemical resistance, and overall cost effective performance of lined pipe.

DETAILED DESCRIPTION OF THE INVENTION

Figure 1:
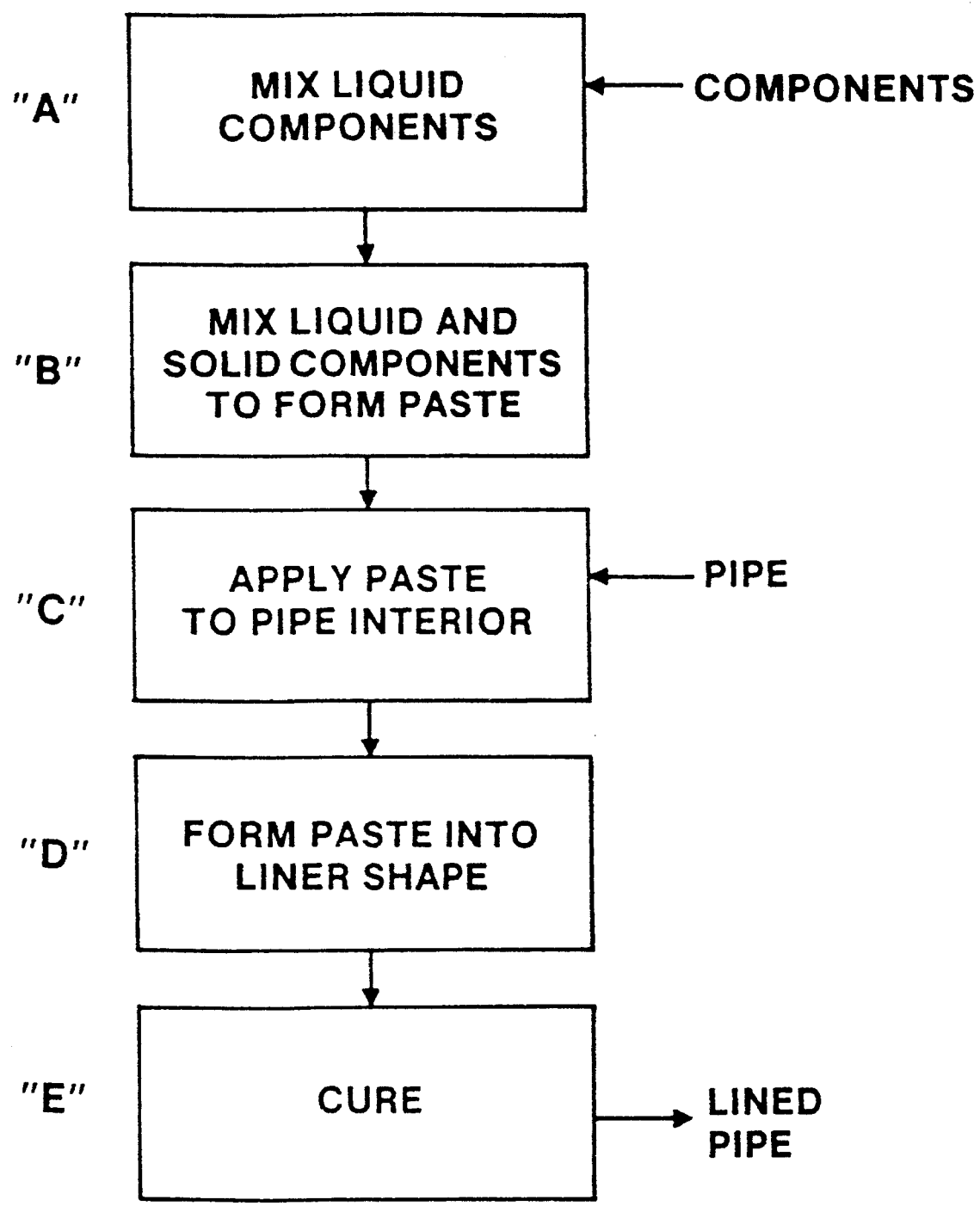
FIG. 1 shows a process flow schematic for hand trowelled lined pipe applications.

The present invention concerns a generally two-phase mixture used to form a polymer concrete fluid barrier. The two phase composition includes a solid particulate (or aggregate) component and a liquid component. The composition is particularly useful to form a polymer concrete lining bonded to a substrate (i.e., a carbon steel pipe). In the preferred embodiment, the two components are mixed, transferred to the pipe interior, and centrifugally spun to shape the liner. The spinning may also be temporarily halted to drain excess liquid. The shaped liner can be cured at ambient or elevated temperatures to form a hardened liner. The resulting lined pipe is resistant to a range of contained geothermal fluids. Also, the resulting liners are applicable to other difficult-to-handle fluid applications, such as process aqueous waste streams, acid gas handling, boiler blowdown, brine processing, and salt water heating/cooling piping.

SOLID OR AGGREGATE COMPONENT

The first of the two components is an aggregate mixture of solid particles forming at least 5, usually at least 50, and preferably at least 75 percent by weight of the material. The aggregate mixture typically includes an inorganic cement (e.g., Portland cement) and an inorganic filler (e.g., particles of a silicious material). In an alternative embodiment, the aggregate contains only inorganic cement.

An important ingredient of the aggregate component is a dry cement (i.e., a material which forms a slurry or paste when mixed with water and hardens into a solid or acts as a binding material). Cements are typically inorganic solids which hydrate after exposure to water which reacts with the cement (i.e., free water). Cements also can form as a precipitate after exposure to water. The dry cement may be a partially hydrated mixture, that is, the cement may react with less water than that required stoichiometrically to react with the cement and binder, requiring additional free water to form a competent solid or binding matrix. A waterless cement used in the invention contains reacted and free water in an amount less than the stoichiometrical hydrating amount of water. However, it is significant in the present invention that the cement not be exposed to amounts of free water which would fully harden it into a solid/binding material during fabrication of the present lined pipe.

The preferred dry inorganic cement is Portland cement. Portland cement contains CaO as one of the primary oxide constituents. Other significant oxide constituents include CaO, $SiO_2$ and $Al_2O_3$, with other inorganic compounds and/or metal oxides, such as Fe, Mg, K, S, Na, Ti, and Mn oxide being optionally present in smaller quantities. A compositional range reported in weight percent of the chief oxide constituents of Portland cement is as follows: Calcium Oxide (CaO) 60–67, Silica ($SiO_2$) 17–25, Alumina ($Al_2O_3$) 3–8, Iron Oxide ($Fe_2O_3$) 0.5–6, Magnesia (MgO) 0.1–4, Sulphur Trioxide ($SO_3$) 1–3, and Soda and/or Potash ($Na_2O+K_2O$) 0.5–1.3. Preferred Portland cements include Types I, II, III and Class G, with Type III and Class G being preferred, and Class G being highly preferred. The dry powder form of these cements has particles having cross-sectional dimensions generally less than 100 microns, typically averaging less than 75 microns.

Since the liquid mixture or component to be described hereinafter typically contains less than 2.0 percent free water by weight of the liquid component and essentially no free water is present in the solid component, the function of the cement is not clear, but is required to obtain the desired properties of the liner. No significant hydration of the cement particles appears to occur during the initial hardening phase of the liner (i.e., polymerization of the liquid component forms the binder). Even small amounts of water may be detrimental (e.g., a water film formed on the surface of the filler may prevent proper coupling between the polymer and the aggregates). Dry cement can help reduce the free water content (i.e., act as a desiccant or drying agent to remove any water film) which may be present during the curing of the polymer.

After the lined pipe is placed in service and the liner exposed to harsh aqueous fluids, some or all of the inorganic cement particles may slowly hydrate. A newly formed hydrate matrix may slowly overlay or replace the matrix provided by the polymer. Relative to cement-containing compositions previously employed, the long-term compressive strength of the liner material of the present invention is improved during exposure of the liner to the brines. It is believed that hydrothermal alteration of the liner composition occurs. Initial service liner properties may therefore not be indicative of later service properties when a geothermal fluid is contained.

The cement may also act as a neutralizer or buffering agent. As an acid or a low pH aqueous fluid permeates the polymer concrete liner, the cement particles may neutralize or raise the pH of the permeating fluids. Any neutralized fluid contacting the substrate carbon steel would be less likely to be corrosive. In an alternative embodiment, additional quantities of lime (calcium oxide)/hydrated lime are added to the aggregate to increase neutralizing properties of the cement-containing composition. Furthermore, additional lime increases the adhesion of the liner to the substrate.

Although the function of the cement in these polymer concretes and geothermal environments has been discussed, it is not clear. The exact chemical mechanism(s) of cement interactions appear to be complex. However, the resulting properties of the liner material containing these cement particles are unusually effective for improved strength, and support the use of the liner in many harsh environments.

A liner can be formed using an aggregate component containing only cement (i.e., containing 100 percent cement and no filler). However, liner properties are still desirable if both a non-cement filler and cement are the constituents of the aggregate mix and, particularly when the filler includes essentially no sand, and more particularly when the filler contains essentially only silica flour. Only a trace amount of cement (i.e., more than 0.1 wt. %) in the aggregate component is required to obtain beneficial results (e.g., removal of a water film) in the fabricated liner properties. The quantity of cement needed is a function of the filler type and overall composition, processing or fabrication parameters (such as by centrifugal spinning). When the two components (i.e., liquid and solid components) are mixed and the resultant material centrifugally spun to form a pipe liner, the optimum ratio of cement to inorganic filler is controlled to a large extent by the spinning parameters. Generally, in the invention, the utilized amount of Portland cement ranges from between 5 and 100 percent by weight of the total aggregate component, and the preferred amount of Portland cement ranges between 30 and 100 percent by weight of the total aggregate component. Cement material containing 35 to 95, and preferably above 40 percent by weight of Portland cement, in the aggregate component has been used to centrifugally cast pipe liners having superior properties. A highly preferred embodiment utilizes at least 50 percent by weight of cement in the aggregate mixture. Most preferably, the cement content of the aggregate component is about 60 to about 85 weight percent.

In an alternative embodiment, a more chemically resistant cement (acid and/or base resistant) has been used. The resistant cement, such as a calcium-aluminate (i.e., high alumina) cement, is used in place of Portland cement. The $Al_2O_3$ and $TiO_2$ content (i.e., at least 35 percent by weight of the cement) of high alumina cements typically exceeds that found in Portland cements. Although high alumina cement has been used to form hydraulic concretes which are more resistant to attack by carbon dioxide and chloride ions (a component of many geothermal fluids), other undesirable properties have made these hydraulic cements less satisfactory for geothermal service. Again, although the role played by dry, high aluminum cement in polymer concrete is poorly defined, desirable geothermal service properties can be shown for polymer concrete compositions which include a high alumina cement. The minimum and maximum amounts of high alumina cement used in the composition are essentially equal to the amounts previously disclosed for Portland cement.

In another alternative embodiment, an expanding cement or non-shrinking cement (i.e., a cement which does not shrink upon setting after mixing with water) has been used, such as a type-K Portland cement. An example of non-shrinking cement is a magnesium oxide cement, such as Plastic Porcelain No. 30, supplied by Sauereisen Cements Co., Pittsburgh, Pa. Non-shrinking and/or expanding cements may also be mixed with other shrinking cements to form an acceptable liner.

Another embodiment includes using a dry, fully hydrated cement which has been crushed to a desirable particle size, typically an average cross-sectional dimension less than 100 microns and preferably from 5 to 50 microns. Any of the above-described cements discussed herein may be utilized, e.g., may be fully hydrated, dried, crushed to desirable particle size and mixed with the liquid component. Furthermore, crushed concrete having average cross-sectional particle sizes less than 100 microns can be employed with the liquid component.

Other types of essentially dry and/or unreacted cements which are normally reacted with sufficient amounts of water (i.e., free water) to form a bonding matrix (but which are set without substantial amounts of water in the composition of this invention) are also acceptable. This includes other silicate based cements and cements which include organic materials, such as plastic containing cement. Combinations of different cements are also possible.

Carefully controlling and limiting the free water content of the material during the material handling and forming may be critical to optimizing polymer concrete liner properties. An aggregate/liquid component mixture, such as a styrene, TMP-TMA, and additive(s) liquid mixture component (as herein described) and a Portland cement and filler solid component mixture, without added portions of water, are formed into samples, cured and subjected to strength testing. For these tests, water is first added to the solid component and allowed to stand 1 hour. The polymerizable liquid mixture is then added, mixed and allowed to cure, first at ambient temperature, then at 93° C. (200° F.) for 66 hours.

Such testing has indicated that water contents of up to approximately 2 percent by weight of the total mixture have little or no effect upon strength (i.e., up to 2 percent added water samples retain at least 90 percent of the strength of samples having no free water). Larger proportions (i.e. greater than 2 percent by weight of the total mixture) of water have produced significant reductions in strength. The material strength of samples having water in excess of 10–12 percent by weight are typically not capable of determination (i.e., sample crumbled). Based upon these tests, drying, partially dehydrating solids or otherwise driving off free water from certain wet materials (e.g., materials which have been exposed to excessive moisture) prior to mixing and forming the liner may be necessary to obtain optimum liner strength and other properties.

A maximum amount of free water in the aggregate and liquid is the amount required to fully react with (e.g., hydrate and be absorbed by) the cement and filler, hereinafter defined as a fully hydrating quantity. A generally applicable maximum amount of free water in the aggregate when no free water has been added to the liquid component is 90 percent of the fully hydrating quantity. For more reliable applications, free water in the aggregate is limited to a maximum quantity of 50 percent of the fully hydrating quantity. For still further reliable applications, a maximum quantity of free water is 10 percent of the fully hydrating quantity. In the preferred embodiment, no free water is added to the aggregate and solid materials exposed to excessive water are dried/dehydrated.

A non-cementitious filler may be used as the major remaining constituent of the aggregate mixture. The typically inorganic (i.e., silicious) filler can be composed of sand, crushed quartz or granite particles. The particles can be in a range of sizes, including powder-like materials, such as silica flour. However, in one embodiment of the invention, no filler is contained with the cement in the aggregate. In some applications, filler makes up less than 10 percent by weight of the aggregate mixture. Usually when the filler is contained with the cement in the aggregate mixture, the filler (i.e., sand and/or a silica flour) comprises between 10 to 90 percent by weight of the aggregate mixture, and preferably less than 70 percent by weight.

In another alternative embodiment, pozzolanic materials/particles are used in the aggregate mixture. The pozzolanic materials include fly ash (i.e., residue after organic materials have been oxidized), processed oil shale (i.e., residue after organic materials have been removed to produce a liquid fuel), crushed brick (fired) and geothermal sludges/brine precipitates. These pozzolanic particles may be acid washed prior to use in the polymer concrete.

Although pozzolanic materials have been used in hydraulic cements, the function of the pozzolanic materials in waterless polymer concrete has not been fully determined. Pozzolanic materials are known to stabilize Portland cement when hydrated. In the polymer concrete of this invention, the pozzolanic materials may slowly combine with the free lime during any water uptake and inorganic cement hydration. Since hydroxides, such as calcium hydroxide, are reactive (i.e., readily subject to chemical attack by geothermal fluids), this combination with a pozzolanic material may improve the chemical (including carbon dioxide) resistance of the hydrated cement which might form.

Particle sizes of the aggregate (cement and other filler particles) mixture are gradated in the preferred embodiment to form a smooth top or inner surface. The filler can include a powder-like silica flour, defined herein as a silicious material having an average particle cross-sectional dimension of less than 100 microns, typically in the range of 5 to 30 microns. A common example is a silica flour having an average dimensional size less than 0.075 mm. The proportion of silica flour as a weight percent of the aggregate component is essentially unlimited, but typically ranges from 0 to 60 percent, preferably from 5 to 40 percent, and most preferably less than 30 percent by weight.

Using gradated filler (i.e., a distribution of filler particle sizes) reduces fluid requirements and minimizes the tendency to form an overly thick skin or surface layer. An undesirable overly thick skin contains an excessive amount of cement-sized particles and polymer as a result of the spin/centrifugal casting process. The aggregate materials, having different sizes and densities, tend to segregate during agitation or centrifuging. The lighter and more easily suspended particles and liquids tend to concentrate at the top (or at the inside diameter of centrifuged liners), forming a smooth desirable surface. Poorly gradated and/or excessive quantities of fine material in the filler can result in overly thick, crack-prone skins or inadequate substrates by depleting the quantity of fine filler material in the main body of the liner. Use of specific gradated aggregates can result in a desirable surface (i.e., smooth skin surface) while limiting excessive segregation tendencies.

A representative distribution (reported in terms of weight percentage and size gradation of the cement and silicious particles) is given in Table 1 as follows:

TABLE 1

| GRADATION OF AGGREGATE PARTICLE SIZES | |
| --- | --- |
| Sieve Size Range, mm. | Weight Percent |
| Filler, 1.400–1.180 | 1.0 |
| Filler, 1.179–0.850 | 6.0 |
| Filler, 0.849–0.425 | 14.0 |
| Filler, 0.424–0.250 | 28.0 |
| Filler, 0.249–0.180 | 3.0 |
| Filler, 0.179–0.106 | 7.0 |
| Filler, 0.105–0.002 | 17.0 |
| Cement, <0.05 | 24.0 |

The aggregate mixture may have at least a two peak (i.e., bi-modal) distribution of particle sizes (i.e., a frequency distribution of particle sizes peaking at two or more size ranges). One of the peaks in the particle size distribution is that belonging to a powder-like material or flour (e.g., silica flour). The second, sometimes overlapping peak, is that belonging to particle sizes representative of cement. The term "overlapping peak" refers to a particle distribution wherein the flour peak and the cement peak are within a sieve size range up to 0.2 mm of each other. However, when sand is present in the aggregate mixture, a non-overlapping third peak is typically exhibited. It is highly preferred that the cement and filler particles in the aggregate component mixture be essentially the same size, e.g., same shape, density, and rate of settling in a given fluid. Particles of the same settling rate have a ratio of settling rates ranging from 0.5:1 to 2:1.

Control of the maximum size particle as well as the distribution of sizes (i.e. gradation) is important in obtaining optimum results, especially for spun or centrifugally cast liners. The maximum particle size is a function of liner thickness and consequently the pipe diameter, as well as other factors. The maximum particle size is generally less than about 2.4 mm for common pipe and for liner sizes currently used in geothermal applications, preferably less than 1.4 mm.

Controlling the ratio of the quantity of the silica flour portion of the aggregate to the quantity of the cement portion of the aggregate is a method of directly controlling cured liner properties, such a post-hydrothermal exposure, and indirectly influencing slurry viscosity and skin thickness. In the presence of sand in the aggregate component, a nominal ratio of four parts cement to one part silica flour has produced a lining having desirable properties. However, a range of cement:flour ratios from 2:1 (two parts cement to one part silica flour) to 10:1 (ten parts cement to one part silica) and higher also produces liners having acceptable properties. The more general range of cement:silica flour ratios, in the presence of sand, is from 5:2 to 4:1. A maximum silica flour content of 30 percent by weight of total solids is a typical practical limit independent of the cement:silica flour ratio when sand comprises at least 5 percent by weight of the filler portion of the aggregate.

It is highly preferred that the aggregate not contain a filler having particles having an average cross-sectional dimension size greater than 100 microns (i.e., not contain sand or other comparably-sized particles), but preferably contain only (e.g., silica flour) filler material. In the absence of sand, a nominal ratio of at least one part cement to one part silica flour has produced a lining having desirable properties. However, a range of cement:flour ratios from 1:1 (one part cement to two parts silica flour) to 15:1 (fifteen parts cement to one part silica flour) and higher also produces liners having acceptable properties. The more general range of cement:silica flour ratios is from 4:7 to 25:1. The most highly preferred proportion of silica flour in the aggregate mixture is about 15 to about 40 weight percent. A maximum silica flour content of 65 percent by weight of total solids in the absence of sand is a typical practical limit independent of the cement:silica flour ratio.

An alternative embodiment especially useful for (but not limited to) hand trowelling applications includes fibrous and/or fibrous shaped fillers in the mixture. The fibers (and/or fiber bundles) generally contains inorganic materials, such as glass, but may also contain other materials, such as graphite. Although fibers of almost any length and diameter can be used, fiber lengths rarely exceed 0.6 cm (0.25 inch) for practical handling considerations. Average fiber diameters typically range from 10 to 20 microns (0.0004 to 0.0008 inch) in diameter. Average fiber lengths typically range from 0.3 to 0.4 cm (0.12 to 0.16 inch) and the most common aspect ratio (i.e., length to diameter) ranges from approximately 100 to 200.

For the purposes of this invention, it is intended that the term "fiber" or "fibrous filler" encompass materials which may have polar or other functional groups in the form of relatively short filaments as well as longer fibers often referred to as "filaments." Illustrative polar functional groups contained in suitable fibers are hydroxyl, ethereal, carbonyl, carboxyl, thiocarboxyl, carboxylate, thiocarboxylate, amido, amino, etc. Essentially all natural fibers include one or more polar functional groups. Illustrative are virgin and reclaimed cellulosic fibers such as cotton, wood fiber, coconut fiber, jute, hemp, etc., and protenaceous materials such as wool and other animal fur. Illustrative synthetic fibers containing polar functional groups are polyesters, polyamides, carboxylated styrenebutadiene polymers, etc. Illustrative polyamides include nylon-6, nylon 66, nylon 610, etc.; illustrative polyesters include "Dacron," "Forttel," and "Kodel"; illustrative acrylic fibers include "Acrilan," "Orlon," and "Creslan." Also, Wollastonite ($CaO.SiO_2$) can be employed. Illustrative modacrylic fibers include "Verel" and "Dynel." Illustrative of other useful fibers which are also polar are synthetic carbon (i.e., graphite), silicon, boron and magnesium silicate (e.g., asbestos) polymer fibers and metallic fibers such as aluminum, gold, and iron fibers. The use of non-polar fibers are also possible in alternative embodiments.

In another alternative embodiment, a small amount (additive) of a solid constituent is added to the solid and liquid mixture to obtain a desired rheology (i.e., slurry or mortar mix/paste consistency). Cab-O-Sil and Hi-Sil have been found to be effective as a thickening or rheology control additives for hand trowelling applications whereby the resulting thixotropic material is manually applied to the pipe interior. The two specific additive materials are currently supplied by Cabot (Cab-O-Sil) and PPG (Hi-Sil) companies. Such additives are believed to be composed, at least in part, of amorphous silica and appear to be highly surface reactive. These amorphous silica additives soak up the "liquid component" after mixing, adding tackiness and body to the two component mixture while not significantly affecting the kinetics of polymerization.

These viscosity additives are not required but can be used in fabricating centrifugally cast liners. Additives were found to be very beneficial in hand lining, repair, and patching operations. The slurry mixtures containing these additives are highly thixotropic and easy to apply, and remain in place until hardening has taken place.

The range of amorphous silica additives (Cab-O-Sil M-5 or EH-5, and Hi-Sil T-600) that can be added to form as much as 25 percent or more by weight, but for practical (i.e., cost, etc.) purposes is restricted to a maximum of 6.0 percent by weight of the solid component (i.e., aggregate mix) comprising the material. Lower concentrations (at least 0.5 percent, typically at least 1.5 percent, but less than 3.0 percent by weight of the aggregate component) are normally sufficient to enhance the thixotropic properties of the mix.

Although other constituents may be present in the solid or aggregate mixture, specifically limited or excluded is acrylamide. Significant quantities of acrylamide were previously cited (i.e., in U.S. Pat. No 4,500,674) as important to the integrity of a polystyrene majority polymer cement. Testing of material made from aggregate and specific liquid constituents hereinafter described, but excluding acrylamide and/or acrylonitrile, has yielded positive results. Liners produced from mixtures which contain no detectable amounts of acrylamide and/or acrylonitrile have been found to withstand harsh geothermal environments. However, minor amounts of acrylamide and/or absorbed acrylonitrile, i.e., less than one (1.0) and preferably less than 0.5 percent by weight of the solid component, are acceptable.

LIQUID COMPONENT

The liquid component contains a combination of styrene, at least one co-monomer, and an optional dissolved polymer, forming a fluid mixture. The combination of the styrene (and optional dissolved polystyrene) comprises less than 50 percent of the fluid mixture. The majority constituent of the liquid component is an olefinic substance, typically at least one polymerizable, poly-olefinically unsaturated co-monomer in the form of a fluid. Typically the poly-olefinically unsaturated co-monomer(s) comprise more than 55 weight percent, and usually more than 60 weight percent of the liquid component mixture. A highly preferred embodiment includes a liquid component mixture containing from 60 to 80 percent by weight of the unsaturated monomer(s).

The styrene, co-monomer(s), and solubilizable polymer fluid mixture polymerizes to form an aggregate binder or binding matrix for the solid component. The binder comprises at least 5 weight percent of the resulting (non-homogeneous) liner material. Because of mixing, compaction and drainage during spinning, 5–10 percent by weight of the total is a preferred minimum proportion of liquid component. The optimum proportion of liquid remaining in the material is a function of spin rate, spin time and aggregate properties.

The dissolved polymer typically contains a homopolymer of styrene, i.e., polystyrene, or a homopolymer of the poly-olefinically unsaturated co-monomer. The polymers are predissolved/premixed typically with the styrene or poly-olefinically unsaturated co-monomer(s). The polystyrene or other polymer may also be predissolved/premixed with the liquid co-monomer(s) or the fluid mixture. The co-monomer optimally is dissolved with dissolved polymer in an amount that at least maximizes the cross-linking with styrene, yet minimizes the amount of dissolved polymer.

The total styrene plus polystyrene content is generally less than 50 percent by weight of the liquid component. Preferably, the styrene/polystyrene mixture content varies from 5 to 45% by weight of the total liquid component, and more preferably from 10 to 40 percent by weight of the total liquid component, and most preferably from 15 to 35 percent by weight of the total liquid component.

In an alternative embodiment, styrene can be used without a dissolved polymer in the liquid component; however, a premixed polymer has been found to improve the properties of some fabricated liners (e.g., less fracturing or cracking). The polystyrene, when used, appears to act as a thickening agent and as an external plasticizer after polymerization. The maximum amount of a dissolved polymer is limited only by styrene solubility considerations, but 14 weight percent dissolved polystyrene in styrene appears to be a practical styrene mixture limit. Choosing the optimal proportion of polystyrene is dependent upon factors such as solubility liner fabrication temperature and spinning parameters, with typical proportions ranging from 1 to 10 weight percent.

The major ingredient in the liquid component is at least one specific polymerizable reactive unsaturate compound containing carbon and hydrogen (i.e., co-monomer). The specific co-monomer(s) used are selected from a specific group of poly-olefinically unsaturated compounds. The molecular structure of these compounds is characterized by at least two reactive olefinic bonds, and typically contains at least one hydrocarbon-containing vinyl group. The preferred monomer has 4 to about 40 carbon atoms and at least 2 vinyl substituents per molecule. The monomer molecule may contain carbonyl, carboxyl, hydroxyl, thiol, thiocarbonyl, carboxylic acid ester, thioester, amine, amide, silane, silanol, siloxane, and combinations thereof. The carbon containing compounds may also contain heteroatoms, such as one or more members selected from the group consisting of nitrogen (N), oxygen (O), and sulfur (S).

The poly-olefinically unsaturate compound can also be characterized as hydrocarbon olefins having at least two vinyl groups and about 4 up to about 20 carbon atoms. Other effective unsaturated compounds include olefinically unsaturated vinyl esters, thioesters; amides of saturated carboxylic acids having up to about 20 carbon atoms; esters, thioesters, and amides of olefinically unsaturated carboxylic acids having up to about 20 carbon atoms; polyesters, thioesters, and amides of saturated polyhydric alcohols; thiols, polyamides, and olefinically unsaturated carboxylic acids having up to about 20 carbon atoms; polyesters, thioesters and amides of saturated poly-carboxylic acids and olefinically unsaturated alcohols, thiols, and amides; and polyhydrocarbenyl silanes and siloxanes having up to about 20 carbon atoms per molecule. However, organosiloxanes may be excluded.

Several compounds within this poly-olefinic unsaturate/vinyl compound group produce acceptable or extraordinary liners for geothermal environments. These include: trimethylolpropane-trimethacrylate (known as TMP-TMA); trimethylolpropane-methacrylate (known as TMP-MA); divinyl benzene; butadiene; hexadiene; polyvinylmethylsiloxane; and gamma-methacryloxypropyl-trimethyloxysilane. Related compounds as co-monomers which may be included comprise: vinyl containing compounds, such as vinyl benzenes; dienes, preferably having a molecular structure characterized by from 5 to 15 carbon atoms; and a group of silicone substituted molecules containing at least two reactive vinyl groups, such as polyvinylsiloxanes and polyvinyl silanes, although the silicone-substituted molecules may be excluded.

Specifically excluded from the composition of the liquid component are significant amounts of dissolved acrylamide and acrylonitrile co-monomers. Both of these materials are costly and can also be considered known or potential carcinogens. Since acrylamide is a solid at ambient temperature, an elevated temperature and extensive mixing are also required to polymerize compositions which contain it. Extensive heated mixing and transfer of the amount needed to line a 40 foot pipe section create still further costs and problems. The composition (liquid and solid components) excludes or limits these two specific co-monomers (acrylamide and/or acrylonitrile) and their derivatives to less than a significant amount (defined quantitatively herein as less than 1.0 percent by weight of the total composition). Preferably, very small amounts (defined herein as less than 0.5 percent by weight of either the liquid or the solid component) of either one or both of these co-monomer compounds may be tolerated, but compositions which exclude acrylamide and acrylonitrile are most preferred for safety, cost and handling ease.

Also specifically excluded from the liquid component of the composition is free water (i.e., water that is available to react with the aggregate mixture). An absolute maximum quantity of free water in the mixture of liquid and aggregate components is the amount required to fully react with the aggregate component (i.e., the fully hydrating quantity). A more generally applicable maximum amount of free water in the liquid component when dry aggregate is used is 90 weight percent of the fully hydrating quantity. For more general applications, the free water in the liquid component is limited to 50 weight percent of the fully hydrating quantity. A more reliable maximum value of free water is to limit it to no more than 10 weight percent of the fully hydrating quantity. In the preferred embodiment, no free water is added to the liquid mixture.

The proportion of one or more of the poly-olefinically unsaturated co-monomers as a weight percent of the liquid component varies depending upon the specific co-monomer(s) used. Overall, the co-monomer proportion can range from above 50 percent to less than 100 percent by weight of the liquid component, preferably more than 55 percent by weight. The minimum practical amounts of some of the specific co-monomers which can produce acceptable liner properties, expressed as a weight percentage of the total liquid component, are as follows: at least 40 percent trimethylolpropane-trimethacrylate; at least 40 percent trimethylolpropane-methacrylate; at least 25 percent divinyl benzene; at least 15 percent of polyvinylmethylsiloxane; at least 15 percent of butadiene; at least 15 percent of hexadiene; and at least 10 percent gamma-methacryloxypropyl-trimethyloxysilane. The maximum practical amount of each of these specific co-monomers is 99 percent by weight of the liquid component, and usually less than about 94 percent by weight of the liquid component.

Although not required, small amounts (e.g., less than about 7 liquid weight percent of the liquid component in some instances) of one or more of the above-described unsaturated co-monomers (particularly gamma-methacryloxypropyl-trimethyloxysilane, and trimethylolpropane-trimethacrylate) act exclusively as a coupling agent. The coupling agent co-monomer(s) is (are) chemically absorbed by or coat(s) the aggregate particles or substrate (i.e., pipe) and provides reactive vinyl attachment sites for the bulk polymer phase, increasing material strength. Typically the coupling agent contains at least one reactive vinyl group. Increasing the proportion of the co-monomer (such as gamma-methacryloxypropyl-trimethyloxysilane) over 7 percent usually has little further coupling effect on material strength. That is, it is surface area-related and the coupling agent appears to have fully coated the majority of the solid mixtures, with the excess acting as an additional co-monomer in the bulk polymer phase. The coupling agent may also fully encapsulate the aggregate particles, when used in higher concentrations.

The relatively small portion of the remaining liquid component is typically composed of polymerization additive(s) or catalyst(s), defined as materials which control the onset and/or rate of polymerization (e.g., initiation or acceleration additives) of the styrene and co-monomer(s). Although a polymerization additive is not required, a trace amount (i.e., minimum detectable amount) is beneficial to induce and control polymerization. The maximum amount of each of these additives is limited primarily by practical limits, such as set times, material performance, and cost.

Solutions of the useful monomers and polymers can be prepared by procedures known in the art to be suitable for the preparation of the styrene and poly-olefinically unsaturated monomers reacting to form a polymer solid or binder. For instance, monomers, solvents and/or polymer dispersions can be prepared by gradually adding each monomer simultaneously to a reaction medium at rates proportionate to the respective percentage of each monomer in the finished polymer and initiating and continuing polymerization by providing in the reaction medium a suitable polymerization catalyst. Illustrative of such catalysts are free radical initiators and redox systems such as hydrogen peroxide, potassium or ammonium peroxydisulfate, dibenzoyl peroxide, methylethylketone peroxide, lauryl peroxide, di-tertiary-butyl peroxide, bisazodiisobutyronitrile, either alone or together with one or more reducing components such as sodium bisulfite, sodium metabisulfite, glucose ascorbic acid, erythorbic acid, etc. The reaction can also be controlled with agitation and temperature sufficient to maintain the reaction rate until all monomers are consumed.

Six percent by weight of the liquid is a maximum practical proportional limit of each polymerization additive or catalyst. The proportion of each polymerization additive is typically limited to a range of from 0.25 to 3.0 percent by weight of the liquid component, and more typically limited to a range of from 0.5 to 1.5 percent by weight.

A specific initiator found particularly useful is benzoyl peroxide. This has been shown to be effective in initiating rapid polymerization at ambient conditions. A nominal 1.0 percent solution (by weight of the liquid monomeric component) of benzoyl peroxide has been used in some of the testing. Methylethylketone peroxide has also been found to be an alternative and/or higher temperature initiator. N,n,-dimethylaniline and cobalt napthenate have been particularly useful as accelerators, respectively, i.e., catalyst, (each also at a nominal concentration of 1% by weight of the liquid component).

Alternative embodiments do not include an initiator or accelerator. Although polymerization can be accomplished without catalysts and controlled by thermal or other means in this alternative embodiment, the preferred method (using catalysts) allows ambient temperature curing and field handling of the composition.

FIG. 1 shows a process by which the two component mixture described above can be used for hand trowelling applications. The mixing step "A" of the trowelling application typically blends at least one of the liquid components with at least one initiator or accelerator at ambient temperature conditions prior to mixing with the aggregate component. Usually the aggregate is first mixed with a liquid coupling agent which coats and/or encapsulates the solid particles. The coating provides a reactive surface which can polymerize internally or with monomers constituting the bulk of the liquid phase. The remainder of the liquid components are then mixed with the aggregate instead of mixing all the liquid components prior to combining with the filler as shown in FIG. 1. The co-functioning initiator(s) and/or accelerator(s) is subsequently added to the final mixture.

In the next process step "B," the solid component is mixed at ambient temperature with the liquid mixture to form a mortar or thick concrete slurry. This must be accomplished well before gelation of the liquid mix has occurred (as characterized by a gel time). A typical example of a gel time when using catalysts is 25–45 minutes. Mixing the initiator(s) and accelerator(s) into the monomeric liquid (Step "A") begins the gelation process, and the remaining slurry and lay up process steps (steps "C" and "D") must be accomplished prior to the gel time. For hand trowelling applications, a rheology control additive is typically included in the solid aggregate mixture, as previously discussed.

In the next process step "C," the thickened slurry is transferred and applied to the interior of the piping section. This slurry application is typically by hand transfer, but can also be sprayed, pumped, drained, ladled or otherwise transferred.

In the next process step "D" the material is formed into the desired shape. This can be accomplished by hand forming (e.g., trowelling) or by using casting forms, vibration for compaction, etc. Liners can be patched or gaps between liner sections filled using similar techniques.

In the final process step "E," the liner is allowed to cure at ambient temperature. Hardening progresses as the polymerization proceeds. In an alternative embodiment, another processing step is added wherein the material is post cured at elevated temperature(s), either at dry conditions and/or when exposed to a hot aqueous fluid, such as a geothermal brine. High temperature curing at 71° C. (160° F.) or higher is usually necessary for siloxane cross-linked systems.

Figure 2:
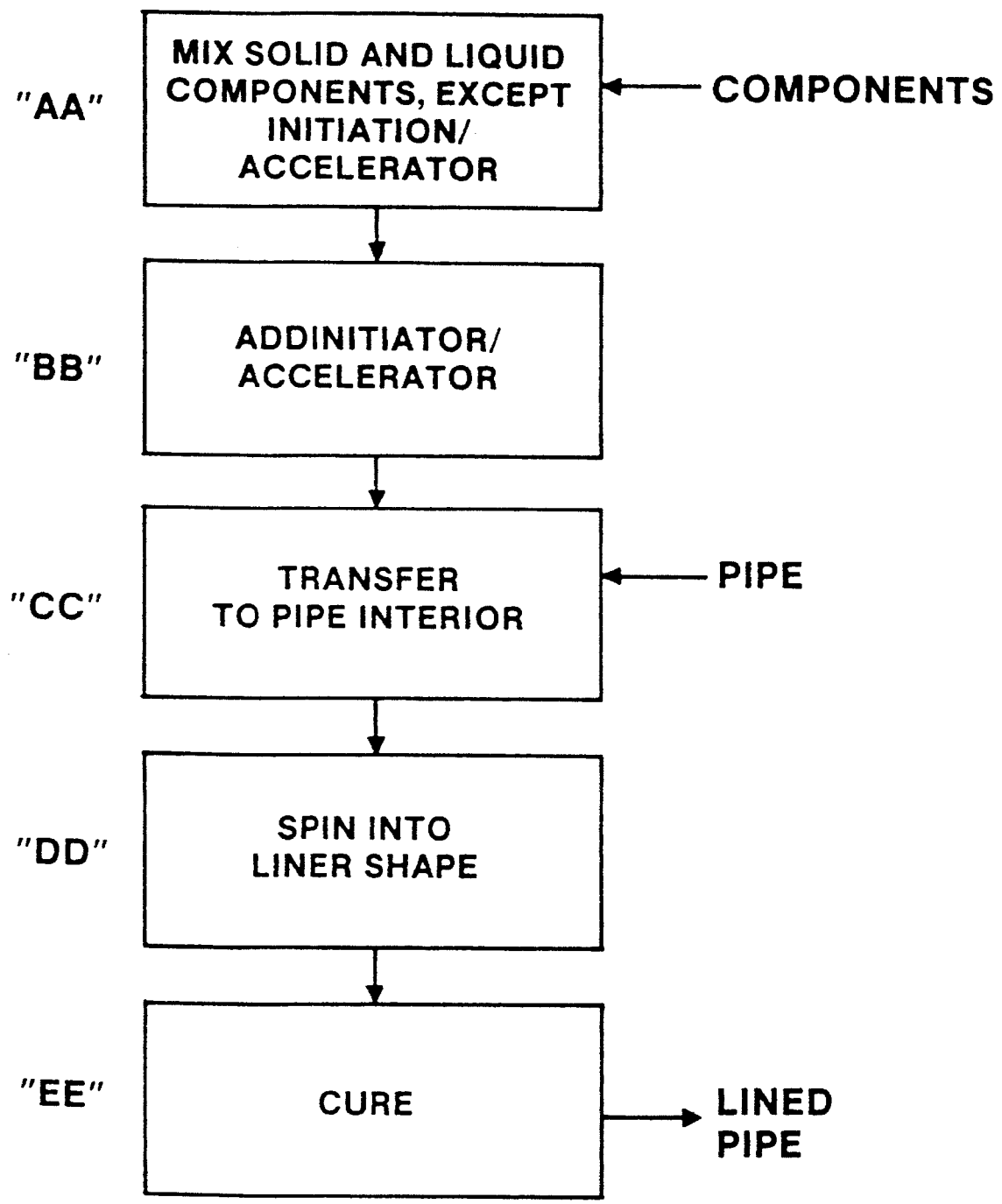
FIG. 2 shows a process flow schematic for centrifugally cast lined pipe applications.

FIG. 2 shows a process of using the two component mixture as described above for centrifugal casting applications. The first step "AA" is to mix the solid and liquid components, as in FIG. 1, to form a slurry. Two initiators (benzoyl peroxide and methylethylketone peroxide) were generally used, one reactive at a low temperature and one designed to be reactive at higher temperatures. Mixing step "AA" can be accomplished by first pre-mixing the solids (i.e., commingling and breaking up agglomerates) and then adding and mixing the liquid component (without the initiator and/or accelerator) to obtain a desired slurry consistency. An alternative to the first step "AA" is to mix solids, liquids and initiators, but withhold the accelerator (or visa versa). The slurry thus formed (without either the accelerator or initiator) can generally be flowed for extended periods of time.

The next step "BB" is to add the polymerization initiator(s) and/or accelerator(s) to the mixture. The addition(s) are mixed into the slurry. The addition(s) begin the gelation process and defines the working period within which the liner must be cast. This adding step "BB" is followed by a transfer step "CC" wherein the slurry is conveyed and applied to the pipe interior. Conveyance may be accomplished by means such as pumping the liquid-like slurry, gravity flow of the slurry via troughs, belt, auger or portable trough conveyance.

The pipe and transferred slurry are then spun around the pipe's cylindrical axis to shape the material into a liner in spinning step "DD". The centrifugal force during the spin casting distributes the slurry material on the interior pipe surface. Dams or barriers are placed at the ends of the pipe sections to retain the material in place prior to and during centrifuging.

In the final hardening step "EE," the liner is allowed to cure. The cure normally occurs at ambient temperature for a time sufficient to harden it for service in geothermal or other applications. Elevated temperature (i.e., oven) post curing may be employed, and is preferred for some mixtures, especially when polyvinylsiloxane is the reactive unsaturate. Exposing the liner to aqueous fluids at elevated temperatures (e.g., geothermal fluids), may also be provided to further harden the liner as part of a post curing step.

When excess polymerizable liquids are present during curing and/or spinning, alternative process step(s) can be provided. These added steps split the spinning step, wherein the excess fluids are allowed to drain from the section after an initial spinning step. Optionally, the section may then be re-spun to minimize slumping, etc. In the initial spinning step, the liner is shaped and the aggregate compacted sufficiently to allow the drainage of excess fluids. In the re-spinning step, the liner is allowed to harden to the extent that further drainage or slumping is precluded.

Unless a release compound or separation material is placed at the spinning mixture's liner/pipe interface, the hardened and cured liner component is bonded (i.e., adheres) to the pipe after the casting process. In an alternative embodiment, release compounds may be applied to the steel piping or fitting (now serving as a form) to create a separate concrete pipe/fitting having an outer diameter equal to the inside diameter of the pipe/fitting form. In modified embodiments, partial bonding of the liner to the pipe or pipe sections, connectors or fittings may allow some relative motion (e.g., resulting from thermal expansion) of the liner with respect to the pipe/fitting. The pipe/fitting can also be pre-treated with a coupling agent or mechanical bonding system (e.g., a welded screen) to facilitate bonding to the liner.

Still other alternative embodiments are possible. These include: a plurality of liner segments within a single pipe section separated by elastomeric or plastic seals; extending the liner beyond the end of the pipe section to interconnect with tanks or other equipment; having the outer pipe composed of other materials, such as other structural metals, relatively rigid elastomers, plastics, concrete, porous or insulating materials. Other alternatives are to place an intermediate material between the pipe wall and liner (i.e., pre-coat the pipe interior), or add a protective enclosure or external covering to the steel pipe.

The invention satisfies the need to provide a low cost, easy to apply liner to steel pipe for use in harsh geothermal or other environments. The dry cement, other aggregate, and the monomers are relatively non-toxic. Costly acrylamide and acrylonitrile have been limited or excluded from the mixture. The mixture hardens to provide a strong thermally stable liner without compromising chemical stability.

Further advantages of the invention include: increased safety, (eliminates need for carcinogenic materials), reliability (as little as a single co-monomer plus coupling agent, if required, reduces complexity), and lower cost (no high temperature cure and use of an inexpensive unsaturated co-monomer and styrene).

The invention is further described by the following examples which are illustrative of specific modes of practicing the invention and are not intended as limiting the scope of the invention in any manner as defined by the appended claims.

EXAMPLE 1

An aggregate mixture (i.e., solid component) and three separate liquid mixtures (i.e., monomer/dissolved polymer component) designated as liquid mixtures C, P and I, respectively, are prepared and mixed to form three distinct and separate slurries. The solid (Table 2) and liquid (Table 3) component compositions are as follows:

TABLE 2

AGGREGATE MIXTURE-EXAMPLE 1

| Constituent | Aggregate weight % |
| --- | --- |
| Gradated silica sand, excluding flour | 70.0 |
| Silica flour (less than 0.075 mm average dimensional size) | 6.0 |
| Portland Cement, Type III | 24.0 |

TABLE 3

LIQUID MIXTURES

| | Liquid weight % | | |
| --- | --- | --- | --- |
| Constituent | C | P | I |
| Liquid Mixture | | | |
| Styrene | 49.0 | 78.0 | 20.3 |
| Polystyrene | 8.0 | 7.0 | 3.2 |
| Trimethylolpropane-Trimethacrylate (TMP-TMA) | 37.0 | 9.0 | 70.5 |
| Gamma-methacryloxypropyl-trimethyloxysilane (A-174) | 3.5 | 3.5 | 3.5 |
| Benzoyl peroxide (BPO) | 1.0 | 1.0 | 1.0 |
| Dimethyl aniline (DMA) | 1.0 | 1.0 | 1.0 |
| Methylethylketone peroxide (MEKP) | 0.5 | 0.5 | 0.5 |

The gradation of silica sand is similar to that shown in Table 1. The amount of liquid component in the mixture varied from between 11.5 and 16 percent of the total weight of the slurry for centrifugally cast liner specimens. The liquid constituents, Liquid Mixtures C, P and I, listed in Table 3 are added together and mixed prior to adding (pouring onto) to three equivalent portions of the aggregates designated in Table 2, along with other compositions (including BPO, DMA & MEKP). The average ambient temperature is roughly 27° C. (80° F.). Using a slurry delivery system primarily based upon gravity flow, the mixtures are transferred separately to the interior of three test pipe sections. Each pipe section is fitted with slurry containment devices (e.g., fluid dams) at each end. The pipe sections are then spun around the pipe centerline axis. The centrifugal force generated distributes the slurry out against the interior pipe wall, thus forming the fluid barrier which fully lined the interior of the steel pipe. The excess fluid is drained off and the material allowed to gel. Gelation occurs approximately 40 minutes following the mixing of the N-n,-dimethylaniline accelerator with aggregate slurry.

The test liners fabricated are roughly 1.3–2.5 cm (0.5–1.0 inch) thick and bonded to the interior of pipe sections having nominal diameters of less than 25.4 cm (10 inches).

The sections are oven cured at elevated temperatures; others are allowed to cure at ambient temperature. The resulting materials are then installed in an autoclave and tested in a simulated geothermal brine. Temperatures of up to 246 degrees Celsius are recorded.

After exposure to the brine for at least 231 days, the initial test specimens are inspected. The lining material is found to be mechanically sound. The compressive strengths (expressed as p.s.i.) for the lining materials C, P and I prepared from Liquid Mixtures C, P and I, are 5,320, 3,720 and 7,250, respectively.

EXAMPLE 2

Liquid Mixture C of Example 1 and an aggregate mixture prepared as per Table 4 are mixed to fabricate a lined pipe test specimen. The process is similar to that described in Example 1. Compositions are as follows:

TABLE 4

| AGGREGATE MIXTURE | |
|---|---|
| Constituent | Aggregate weight % |
| Gradated silica sand, excluding flour | 70 |
| Silica flour (less than 0.075 mm average dimensional size) | 6.0 |
| Portland cement, Class G | 24 |

Results after exposure to brine for at least 231 days in the same manner as in Example 1 indicate the lining material, designated as G, has a compressive strength of 3,650 p.s.i. Such a compressive strength is considerably lower than the compressive strength of comparable lining material C of Example (i.e., 5,320 p.s.i.), which instead contains Type III Portland cement.

EXAMPLE 3

Aggregate Mixtures A, B and IV, are prepared as per Table 5 and mixed with separate portions of Liquid Mixture C of Example 1 to fabricate lined pipe test specimens A, B and IV. The process is similar to Example 1. Compositions are as follows:

TABLE 5

| AGGREGATE MIXTURES | | | |
|---|---|---|---|
| | Aggregate weight % | | |
| Constituent | A | B | IV |
| Aggregate Mixture | | | |
| Gradated silica sand, excluding flour | 70 | 70 | 0 |
| Silica Flour (less than 0.75 mm over average dimensional size) | 30 | 0 | 29 |
| Portland Cement, Type III | 0 | 30 | — |
| Portland Cement, Class G | — | — | 71 |

Results after brine exposure for at least 231 days in the same manner as is comparable to Example 1 indicate the lining materials prepared from Aggregate Mixtures A, B and IV, have compressive strengths (determined as p.s.i.) of 3,610, 4,970, and 12,130, respectively.

The compressive strengths of Lining Materials C, P, I from Example 1, Lining Material G from Example 2 and Lining Materials A, B and IV from Example 3 are summarized in Table 6:

TABLE 6

| Li-ner | Aggregate | | | Liquid TMP-TMA | Styrene/ Poly-styrene | Compress. Strength |
|---|---|---|---|---|---|---|
| | Cement Type | Cement Wt. % | SiFl, Wt % | Sand, Wt. % | Wt. % | Wt. % | p.s.i. |
| G | G | 24 | 6 | 70 | 37 | 58 | 3,650 |
| C | III | 24 | 6 | 70 | 37 | 58 | 5,320 |
| P | III | 24 | 6 | 70 | 9 | 85 | 3,720 |
| I | III | 24 | 6 | 70 | 70.5 | 23.5 | 7,250 |
| A | III | 0 | 30 | 70 | 37 | 58 | 3,610 |
| B | III | 30 | 0 | 70 | 37 | 58 | 4,970 |
| IV | G | 71 | 29 | 0 | 37 | 58 | 12,130 |

Table 6 illustrates that although a lining material containing Portland Cement Class G and having a relatively low cement content (Liner G) is considerably weaker than a comparable lining material containing Portland cement type III (Liner C), major cement proportions of the aggregate increase the liner compressive strength (Liner IV) by a factor of more than two compared to Liner C and by a factor of more than three compared to Liner G. This is particularly surprising.

Table 6 further illustrates that a liquid component containing major proportions of a poly-olefinically unsaturated co-polymer, such as TMP-TMA, and minor proportions of styrene, produces a lining material (Liner I) having a superior compressive strength (i.e., by a factor of at least 1.3) compared to a lining material (Liner C) which is prepared from a liquid component containing a styrene major ingredient and a TMP-TMA minor ingredient. The data in Table 6 further suggest that the liquid components containing major proportions of the poly-olefinically unsaturated co-polymers, as shown in the preparation of Liner I, when mixed with relatively high proportions of cement in the aggregate, such as in the preparation of Liner IV, can produce lining materials of exceptional compressive strength.

In all of the previous examples, no water was added. The solid component, if present, was observed to be dry, although some incidental uptake of moisture may have occurred. In addition, at least one of the catalysts (i.e., polymerization additives) is known to be supplied as a water emulsion for safety and handling reasons.

While the preferred embodiment of the invention has been shown and described, and some alternative embodiments and examples also shown and/or described, changes and modifications may be made thereto without departing from the invention. Accordingly, it is intended to embrace within the invention all such changes, modifications and alternative embodiments as fall within the spirit and scope of the appended claims.

What is claimed is:

1. A composition comprising a waterless cement, styrene, and at least one poly-olefinically unsaturated co-monomer for reaction with said styrene, said composition comprises more of said co-monomer by weight than said styrene, based upon the total weight of all co-monomer and styrene present in said composition, and wherein said composition contains less than 1.0 weight percent of acrylamide and acrylonitrile.

2. The composition of claim 1 which further comprises water and aggregate, wherein said water does not exceed 12 percent by weight of the total composition and said cement comprises a major proportion of said aggregate.

3. A composition for forming a solid material, the composition comprising a two component mixture which comprises:

an aggregate component comprising a cement material containing a solid component which can form a solid binder when reacted with a minimum quantity of water characterized as hydrating water;

a liquid component comprising a majority ingredient of one or more reactive poly-olefinic unsaturate compounds and a minor ingredient of styrene; and wherein said composition contains reacted and free water in an amount less than said hydrating water, and the liquid component contains less than 1.0 weight percent of acrylamide or acrylonitrile.

4. The composition of claim 3 wherein:

said liquid component further comprises a dissolved polymer; and said cement material comprises an inorganic cement.

5. The composition of claim 4 wherein:

the proportion of said majority ingredient is greater than 55 percent by weight of said liquid component and said reactive poly-olefinic unsaturated compound is reactive at two or more hydrocarbon reactive sites.

6. The composition of claim 5 wherein said dissolved polymer comprises a homopolymer of styrene or of said reactive unsaturated compound.

7. The composition of claim 6 wherein the proportion of said cement material is at least 50 percent by weight of said aggregate component.

8. The composition of claim 6 wherein said reactive unsaturated compound is selected from the group consisting of compounds having a molecular structure characterized by a hydrocarbon containing at least one reactive vinyl group.

9. The composition of claim 3 wherein said reactive unsaturated compound comprises a moiety selected from the group consisting of trimethylolpropane-trimethacrylate, trimethylolpropane-methacrylate, divinyl benzene, butadiene and hexadiene.

10. The composition of claim 4 comprising a reaction product of said cement, said styrene and at least one co-monomer of said poly-olefinic unsaturated compound for reaction with said styrene, and a polymer dissolvable in at least one of said monomers, said co-monomer comprising a greater weight percentage than said styrene, said reaction product being essentially free of acrylonitrile and acrylamide reaction products.

11. The composition of claim 10 wherein said reaction product is essentially free of fully hydrated cement reaction products.

12. The composition of claim 3 wherein said aggregate further comprises a filler material.

13. The composition of claim 12 wherein said liquid component further comprises at least one reactive unsaturate which acts primarily as a coupling agent for said filler material.

14. The composition of claim 13 wherein said coupling agent comprises gamma-methacryloxypropyl-trimethyloxysilane.

15. The composition of claim 14 wherein the proportion of said reactive poly-olefinic unsaturated compound, as a weight percent of said liquid component, is selected from the group consisting of at least 40 percent trimethylolpropane-trimethacrylate, at least 40 percent trimethylolpropane-methacrylate, at least 25 percent divinyl benzene, at least 15 percent of polyvinylmethylsiloxane, at least 15 percent hexadiene and at least 10 percent gamma-methacryloxypropyl-trimethyloxysilane.

16. The composition of claim 15 wherein said liquid component further comprises a polymerization additive comprising a polymerization initiator selected from the group consisting of benzoyl, methlethylketone, and di-tertiary-butyl peroxides and combinations thereof, and a polymerization accelerator selected from the group consisting of n,n-dimethylaniline and cobalt naphthenate.

17. The composition of claim 16 wherein the range of constituent proportions of said liquid component as a weight percent of said liquid component are:

| Reactive poly-olefinic unsaturated compound | 60 to 94% |
|---|---|
| Styrene mixture | 5 to 44% |
| Benzoyl peroxide | 0.25 to 3% |
| Dimethyl aniline | 0.25 to 3% |
| Methylethylketone peroxide | 0.25 to 3% |

18. The composition of claim 12 wherein said filler material comprises silicious material in the form of particles.

19. The composition of claim 18 wherein said filler material further comprises a pozzolanic material.

20. The composition of claim 19 wherein said pozzolanic material is selected from the group consisting of fly ash, processed oil shale, and geothermal fluid precipitates.

21. The composition of claim 20 wherein said filler material further comprises fibrous shaped materials.

22. The composition of claim 5 wherein said inorganic cement comprises a Portland cement at a proportion between 30 and 100 percent by weight of the aggregate component.

23. The composition of claim 5 wherein said aggregate component consists essentially of a Portland cement.

24. The composition of claim 21 wherein said inorganic cement comprises a non-shrink cement.

25. The composition of claim 24 wherein said cement comprises a high alumina cement at a proportion of between 30 and 100 percent by weight of the aggregate component.

26. The composition of claim 5 wherein said inorganic cement comprises greater than 40 weight percent of the aggregate component.

27. The composition of claim 18 wherein said silicious material comprises a gradated aggregate mixture having sand particles and a silica flour portion, said silica flour portion having an average cross-sectional particle size of less than 100 microns.

28. The composition of claim 27 wherein the ratio of the amount of said silica flour to the amount of said cement portion of said aggregate component are within a range from 1 part silica flour:10 parts cement ratio to 1 part silica flour:2 parts cement ratio.

29. The composition of claim 18 wherein said aggregate component consists essentially of cement and a silica flour portion having an average cross-sectional particle size of less than 100 microns.

30. The composition of claim 29 wherein the ratio of the amount of said cement to the amount of said silica flour portion of said aggregate component are within a range from 1 part cement:1 part silica flour to 15 parts cement:1 part silica flour ratio.

31. The composition of claim 27 wherein:

said solid material is a liner cast within a pipe, said liner having an inner surface layer exposed to said fluid; and said particle sizes of said aggregate mixture is gradated so as to minimize the radial thickness of said surface layer when said composition is centrifugally cast.

32. The composition of claim 31 wherein said aggregate component further comprises a viscosity control additive containing a surface reactive amorphous silica.

33. The composition of claim 18 wherein the maximum constituent proportions, as a weight percent of said solid aggregate component, are comprised of:

| Silica sand, including silica flour | 0 to 80% |
|---|---|
| Silica flour | 0 to 30% |
| Portland cement | 30 to 99.5% |
| Amorphous silica additive | 0.5 to 3% |

34. The composition of claim 18 wherein said silicious particles consist essentially of a silica flour having an average particle size from 5 to 30 microns.

35. The composition of claim 1 further comprising a reaction product formed from (1) said cement, (2) said styrene, and (3) said co-monomer for reaction with said styrene.

36. A two component composition for forming a polymer concrete solid, said components comprising a solid component mixture of silicious particles and Portland cement particles, and a liquid component mixture comprising a minor proportion of styrene and a major proportion of a reactive poly-olefinic unsaturate selected from the group consisting of trimethylolpropane-trimethacrylate, trimethylolpropane-methacrylate, divinyl benzene, butadiene, hexadiene, polyvinylsiloxanes, polyvinyl silanes, and combinations thereof, in the absence of sufficient amounts of free water to fully hydrate said Portland cement, and less than 1.0 weight percent of said liquid component mixture containing acrylamide or acrylonitrile.

37. The composition of claim 36 wherein said solid component mixture consists essentially of said silicious particles having a cross-sectional dimension less than 100 microns and at least 40 weight percentage of said Portland cement particles.

38. The composition of claim 36 wherein the ratio of the amount of said inorganic cement particles to the amount of filler material is within the range from 4 parts cement:7 parts filler to 25 parts cement:1 part filler.

39. A composition comprising a substantially rigid polymer concrete comprising at least five weight percent, based on the weight of said concrete, of substantially solid particles disbursed throughout said concrete and at least three weight percent, based on the weight of said concrete, of a co-polymer particle binder, with at least 50 weight percent of said particle binder comprising a polymerized, poly-olefinically unsaturated co-monomer and a minor amount of said polymer binder comprising a polymer of styrene, said concrete being substantially free of polymerized acrylamide and acrylonitrile.

40. The composition of claim 39 wherein said polymerized, poly-olefinically unsaturated co-monomer is cross-linked with at least a portion of said polymer of styrene.

41. The composition of claim 40 wherein said polymer concrete is at least partially formed by spin casting prior to the formation of said co-polymer particle binder.

42. The composition of claim 40 wherein said solid particles are selected from the group consisting of cement, silica, metal oxides, and combinations thereof, and said solid particles having an average particle cross-sectional dimension of less than 100 microns.

43. The composition of claim 42 wherein said poly-olefinically unsaturated co-monomer has 4 to about 40 carbon atoms further comprises at least one other component selected from the group consisting of carbonyl, carboxyl, hydroxyl, thiol, thiocarbonyl, carboxylic acid ester, thioester, amine, amide, silane, silanol, siloxane, halo groups and combinations thereof, or heteroatoms-atoms selected from the group consisting of nitrogen, oxygen sulfur and combinations thereof.

44. The composition of claim 39 wherein said styrene and said co-monomer form a monomer fluid mixture and said particle binder further comprises at least about 5 weight percent, based upon the weight of said particle binder, of a preformed polymer solubilizable in said monomer fluid mixture, wherein said preformed polymer is formed prior to the formation of said particle binder.

45. The composition of claim 44 wherein said preformed polymer is a polystyrene homopolymer or a homopolymer of said polymerized, poly-olefinically unsaturated co-monomer.

46. The composition of claim 42 wherein said polymerized, poly-olefinically unsaturated co-monomer comprises a moiety selected from the group consisting of trimethylolpropane-trimethacrylate, trimethylolpropane-methacrylate, divinyl benzene, butadiene, hexadiene, and silicone-substituted hydrocarbon monomers, and said solid particles comprise silica flour and at least 30 weight percent of said cement.

47. A protective element comprising the reaction product of claim 35 wherein said cement comprises at least 50 weight percent of aggregate particles and said reaction product further comprising a polymerized matrix binding said aggregate particles, said matrix comprising a minority of polystyrene component, calculated by weight of total polymer, and a majority of copolymer produced from said co-monomer, calculated by weight of total polymer, said matrix containing essentially no acrylamide and acrylonitrile materials.

48. A composition for forming a solid material, the composition characterized as a two component mixture which comprises:

an aggregate component comprising greater than 30 percent by weight of the total aggregate component of an inorganic cement material containing a material which can form a solid binder material when reacted with a minimum quantity of water characterized as a hydrating water;

a liquid component comprising a major proportion of one or more reactive poly-olefinic unsaturated compounds and a minor proportion of styrene; and wherein the liquid component contains less than 1.0 percent acrylamide or acrylonitrile, and wherein the composition contains reacted and free water in an amount less than said hydrating water.

49. The composition of claim 48 wherein said reactive poly-olefinic unsaturated compounds comprise a moiety selected from the group consisting of trimethylolpropane-trimethacrylate, trimethylolpropane-methacrylate, divinyl benzene, butadiene, hexadiene, and silicone-substituted hydrocarbon monomers which contain at least one reactive vinyl group and combinations thereof.

* * * * *